Sept. 19, 1944. M. O. THRUSH 2,358,669
SELF-LUBRICATED BEARING
Filed Nov. 12, 1940
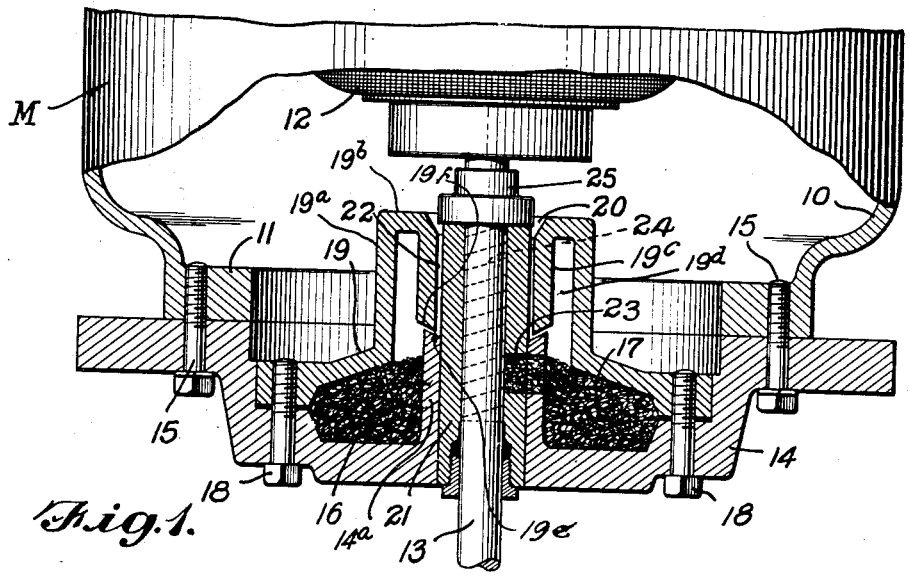
Fig. 1.
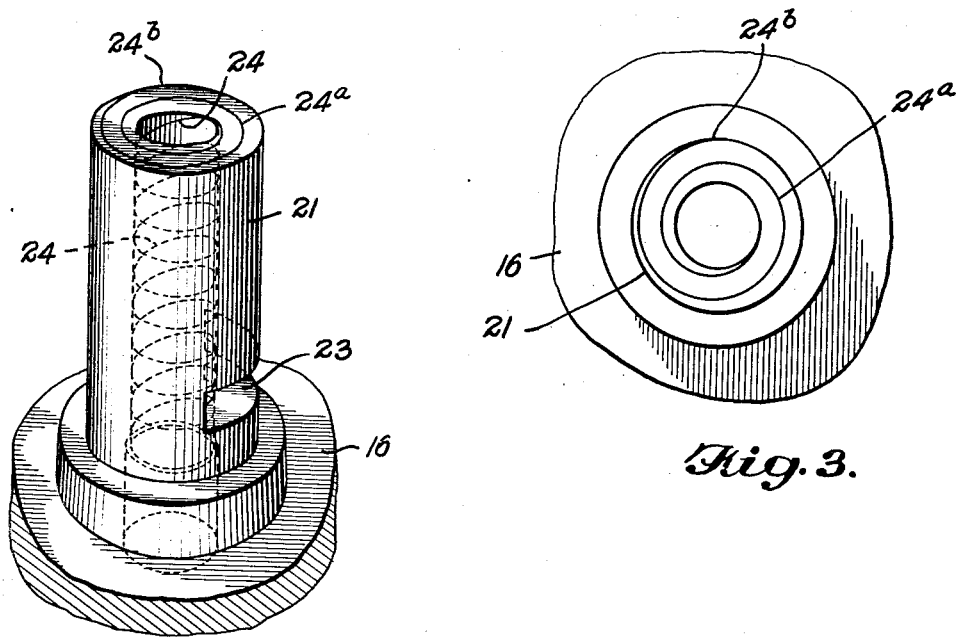
Fig. 2.
Fig. 3.
Inventor
M. O. Thrush
By
H. Yates Dowell
Attorney Patented Sept. 19, 1944

2,358,669

UNITED STATES PATENT OFFICE 2,358,669

SELF-LUBRICATED BEARING

Marquis O. Thrush, Peru, Ind., assignor to The Thrush Company, Peru, Ind.

Application November 12, 1940, Serial No. 365,352

8 Claims. (Cl. 308—134.1)

This invention relates to a self-lubricated combined radial and thrust bearing particularly adapted for electric motors of the vertically disposed type, as in certain makes of water circulators for hot water heating systems.

An object of the invention is to provide a self-lubricated combined radial and thrust bearing for vertical or upright shafts which is of simple low-cost construction yet highly efficient in operation.

Another object is to provide a sealed-in combined radial and thrust bearing assembly for vertically-disposed shafts wherein a lubricant is caused to circulate from a reservoir upwardly around the shaft and thence between the thrust bearing and adjacent surface of the radial bearing and back to the reservoir, the oil being retained in the reservoir irrespective of the position of the parts during handling, shipping and storage.

Another object is to provide a bearing unit for electric motors of the vertically disposed type wherein a constant supply of lubricant is maintained at all times without danger of the lubricant passing into contact with the armature and field winding and coacting parts of the motor.

A further object of the invention is to provide a combined radial and thrust bearing unit for electric motors of the vertically disposed type which may be used as an end plate for the motor housing and which is easily applied and removed as a complete unit.

The foregoing and other objects and advantages will become apparent in view of the following description taken in conjunction with the drawing, wherein:

Fig. 1 is a view in sectional elevation of the lower portion of an electric motor of the type commonly used for driving a circulator for heating systems having a bearing unit embodying the features of the present invention applied thereto;

Fig. 2 is a view in perspective of the radial bearing portion of the assembly; and Fig. 3 is a top plan view of Fig. 2.

Referring to the drawing in detail, an electric motor is generally indicated at M and includes a sectional housing 10 having a bolting-on flange 11 at the base thereof and an armature 12 which is mounted on a vertically disposed shaft 13. Motors of the type illustrated are generally used to drive impellers for water circulators in hot water heating systems, the shaft 13 continuing downwardly through a bracket or bonnet, not shown, and having an impeller, also not shown, connected to the lower end thereof. Rotation of the shaft is always in one direction.

The improved combined radial and thrust bearing assembly comprises an end plate 14 which is bolted onto the flange 11 by means of screw bolts 15. The central portion of the plate 14 around the shaft opening is projected upwardly in the form of a boss 14a. A reservoir 16 is formed in the end plate 14 around the boss 14a, said reservoir having therein a suitable absorbent packing 17 such as ordinary cotton waste or like absorbent material.

Connected to the inner or upper side of the end plate 14 by means of screw bolts 18 is a cap or closure plate 19 which coacts with the end plate 14 to complete the reservoir 16. The central portion of the plate 19 is projected upwardly in the form of a cylindrical wall 19a, then horizontally at 19b and then downwardly to form a boss 19c, thus to provide an annular drain receptacle or oil receiver 19d which in effect forms a continuation of the reservoir 16. The function of this receptacle or oil receiver is to catch and retain any free oil in the event the motor is turned upside-down for any material length of time as for example during shipment and storage, the oil draining back to the reservoir 16 when the motor is righted. It will be noted that the contiguous ends of the bosses 14a and 19c are shaped and spaced in a manner such as to facilitate transfer of oil from one surface to the other. Thus the upper end of the boss 14a is formed with an upwardly and outwardly inclined surface 19e and the lower end of the boss 19c is formed with a like surface 19f, the outer diameter of boss 19c being greater than that of boss 14a. Should the unit be inverted during handling, as for instance during shipment, residual oil in the reservoir 16 will pass over the relatively small gap or space between the contiguous ends of the bosses and into the receiver 19d.

The inner edge of the wall 19b is beveled to form a funnel-shaped baffle wall 20, the purpose of which will presently be apparent.

Rigidly fixed in the central shaft opening of the end plate 14 is a radial bearing 21 which may be made of any suitable bearing material, said bearing projecting upwardly through the central boss 14a and the cylindrical wall 19c but in spaced relation to the latter, leaving an oil return flow channel 22. Return flow channel 22 communicates with the reservoir 16 through the aforesaid space between the contiguous ends of bosses 14a and 19c.

The lower portion of the bearing 21 is in communication with the reservoir 16 by means of an opening or slot 23, and around the inner surface of the said bearing is formed a continuous spiral groove 24, the said groove starting at the lower extremity of the bearing below the slot 23 and continuing upwardly to the top of the bearing and thence radially outwardly in the form of a spiral convolution 24a on the surface of the bearing, note particularly Figs. 2 and 3, the said spiral 24a terminating at its outer end at the outer edge of the bearing as indicated at 24b.

The groove 24, 24a, 24b is relatively small, being comparable to a fine thread. In other words, the groove is of depth just sufficient to hold a quantity of oil in excess of the oil film between the shaft and adjacent smooth surface of the bearing so that the shaft will exert pressure thereon during rotation in a direction counter to said groove and cause the oil to pass upwardly in the groove, the upwardly moving oil in the groove and the cohesive force inherent in the oil coact on the film of oil in the restricted space around the shaft and cause a general upward movement of oil from the well or sump 16.

The top of the radial bearing 21 provides a bearing surface for a thrust bearing 25, which is fixed to the shaft 13 and rotates on the upper surface of the bearing 21. This thrust bearing is shown as consisting of an annulus or collar of bearing material, such as graphitic composition, carbon or the like but may consist of a ball or roller bearing unit. However, due to the highly efficient lubricating action rendered possible by the present invention, the thrust bearing may consist of a simple annulus of ordinary bearing material.

In operation, as the shaft 13 rotates, oil is taken from the absorbent material 17 in the reservoir 16 by the spiral groove 24, and due to the combined lifting action of the rotating shaft on the oil in this spiral and the cohesive force inherent in the oil, the latter is caused to move upwardly around the shaft 13 and provide a film of lubricant between said shaft and the radial bearing 21. When this constantly upwardly moving film of oil reaches the top surface of the radial bearing, it is directed radially outwardly between said latter surface and the adjacent surface of the rotating thrust bearing 25, from whence it flows downwardly through the flow channel 22 back to the absorbent material 17 in the reservoir 16. The funnel-shaped wall 20 functions to direct the oil into the flow channel 22. It will be noted that wall 20 extends above radial bearing 21; hence it will catch any droplets of oil thrown out between the rotating thrust bearing 25 and the top of radial bearing 21.

The absorbent material 25 preferably carries just enough oil to ensure proper lubrication for the bearings, there being sufficient absorbent material to carry this amount of oil in suspension without bringing the absorbent material to full saturation point. Under these conditions there is substantially no free oil in the reservoir 16, so that in handling, shipment and storage no oil can be lost should the package containing the oil be inverted, nor will oil be permitted to pass into the electrical parts of the motor during installation of the motor. Also, when the impeller shaft ceases to rotate, any lubricant that gravitates down the shaft to the sump or well 16 is reabsorbed by the material 17. However, due to provision of the excess oil receiver 19d there need be no exact determination of the amount of oil in the reservoir 16 since the material 17 may carry oil beyond the saturation point, and may even be dispensed with. The spiral groove may start below the inlet 23 so there will be a tendency for the oil to be continually urged away from the outer end of the bearing in which event the clearance at this point may be slightly increased to lessen the pressure on the oil film and permit a certain amount of gravity flow into this area when the shaft is idle; or this portion of the radial bearing may remain smooth and permit oil to lubricate the shaft in this area by gravity flow. In both instances, when the motor is idle, residual oil in the form of a film around the shaft below the opening or inlet 23 is held in suspension by capillary action. However, to ensure against possible leakage of oil at this point, a suitable packing gland may be provided.

It will be understood that certain limited changes in construction and design to adapt the improved bearing to varying types of installations may be made without departing from the spirit or scope of the invention as defined by the appended claims.

What is claimed is:

1. An upright bearing assembly comprising, housing means forming a lower oil reservoir and a communicating upper oil trap each having an inner annular wall surrounding an upright bearing member, said bearing member being positioned to contact said wall of said reservoir and to be spaced from said wall of said trap to form a return flow channel therebetween, an upright rotatable shaft extending through said bearing member, said reservoir communicating with said shaft and said channel, a spiral groove in the inner wall and top face of said bearing member communicating with said channel, and a thrust bearing fixed to said shaft and arranged to rotate on said top face.

2. A bearing assembly for an upright shaft comprising, in combination, housing means forming a lower oil reservoir and an upper oil trap, said reservoir and oil trap communicating with each other, an upright radial bearing for the shaft having a substantially flat upper end, said reservoir and oil trap each having a boss surrounding the radial bearing, the bosses being slightly separated at their contiguous ends to provide therebetween a passage for discharging return oil into said reservoir, a thrust bearing fixed to said shaft and rotatable on the upper end of said upright radial bearing, the inner wall of said radial bearing having a spiral groove therein, the upper end of said radial bearing having a spiral groove communicating with the first-mentioned spiral groove and extending out to the edge of said upper end, the boss which is formed from the oil trap being spaced from the radial bearing to provide a return oil channel extending along the outside of the radial bearing from the upper end of the radial bearing to the aforesaid oil discharge passage, and ports in the radial bearing and lower boss to communicate the interior of the reservoir with the inner wall of said radial bearing.

3. In combination with a vertical shaft and a radial bearing for said shaft, said radial bearing having a spiral groove formed in the walls thereof whereby oil may be lifted to the upper end of the radial bearing when the shaft is rotating in the proper direction, means providing an oil reservoir surrounding the lower part of said radial bearing, said radial bearing having an opening therein so that oil from the reservoir may reach said spiral groove, means providing an oil trap directly above the reservoir and in communication therewith, said last named means surrounding the radial bearing, an oil return channel being provided between the last named means and the radial bearing and discharging oil into said reservoir, a thrust bearing fixed on said shaft and rotating on the top end of said radial bearing; the parts being so constructed and arranged that oil lifted in said spiral groove passes out between the thrust bearing and the top end of the radial bearing and returns to the reservoir via said oil return channel.

4. The invention according to claim 3 wherein the oil return channel is in part formed by a funnel-shaped wall surrounding and rising above the space between the rotating thrust bearing and the top end of the radial bearing; the lower, smaller end of said funnel-shaped wall discharging into a narrower portion of the return channel which lies between the radial bearing and the oil trap.

5. The invention according to claim 3, wherein the oil trap has a central boss surrounding the upper portion of the radial bearing and the part which provides the reservoir has a central boss which surrounds the lower portion of the radial bearing, said bosses having their end surfaces almost touching so that oil will transfer from one surface to the other but spaced apart far enough to permit oil to pass therebetween, the space between the bosses providing a part of the oil return channel and communicating with the interior of the oil trap, the said end surfaces of the bosses being inclined upwardly and outwardly from the radial bearing, so that when the assembly is inverted oil will not pass inwardly to the return channel.

6. An upright self-lubricating bearing comprising in combination with a vertical shaft and a radial bearing therefor, housing means shaped to define an oil reservoir and a communicating oil trap thereabove with the inner walls of the trap and reservoir surrounding said radial bearing, a thrust bearing fixed to said shaft in bearing engagement with the top of the radial bearing, means for conducting oil upwardly around the shaft and outwardly between contiguous surfaces of said radial bearing and thrust bearing, the inner wall of the oil trap being spaced from said radial bearing to provide a return flow channel for the oil and said latter wall at its lower extremity terminating in spaced relation with respect to the upper end of the inner wall of the reservoir to provide a discharge passage for return oil into the reservoir, the contiguous end surfaces of the inner wall of the said trap and the inner wall of said reservoir being beveled upwardly in overlapping relation to facilitate drainage of oil from the reservoir into the trap in the event the bearing is inverted, the inner wall of the trap being of greater diameter than that of the inner wall of the reservoir to prevent flow of oil back into the discharge passage when the assembly is returned to upright position.

7. An upright self-lubricating bearing comprising in combination with a vertical shaft and a radial bearing therefor having a thrust bearing face on its upper end, housing means shaped to define an oil reservoir and a communicating oil trap thereabove with the inner walls of the trap and reservoir defining a bore for receiving the radial bearing, the inner wall of the trap being spaced from said radial bearing to provide an annular return flow channel for oil and the lower end of said latter wall terminating in spaced relation with respect to the upper end of the inner wall of the reservoir to provide a discharge passage communicating the return channel with the reservoir, a thrust bearing secured to said shaft and disposed on the top surface of the radial bearing, said latter bearing being formed with a spiral groove on its inner surface for conducting oil upwardly around the shaft, another groove on the top surface of the radial bearing for conducting oil outwardly between contiguous surfaces of the radial and thrust bearings to the return flow channel, the inner wall of the reservoir being slotted to communicate the reservoir with the interior of the radial bearing, the upper end of the annular return flow channel extending above the top surface of the radial bearing and being substantially funnel-shaped to more effectively direct oil into said return flow channel.

8. For application to the bottom of an upright housing in which a vertical shaft is mounted, an end plate assembly adapted to provide an improved lubricated bearing for said shaft, the end plate proper being of relatively large diameter and of shallow dish-like formation with a hollow boss projecting upwardly therefrom, the plate around said boss defining an oil reservoir, a cover or cap detachably connected to the inner or upper side of said plate over said reservoir, said cover being formed with an upwardly projecting outer wall terminating in a substantially horizontal portion and a downwardly directed boss defining an oil trap, said bosses being in substantially axial alignment, a radial bearing secured in the end plate boss but spaced from the cover plate boss, the space thus provided defining an annular return flow channel for oil, a thrust bearing disposed on the upper end of said radial bearing, the inner wall of said radial bearing being formed with a spiral groove and said end plate boss and radial bearing being formed with an oil passage communicating the reservoir with the interior of the radial bearing and whereby oil is conveyed upwardly around the shaft to the top of the radial bearing and thence outwardly into the return flow channel between the radial bearing and the cover boss, the upper end of the cover boss being of substantially funnel-shape to more effectively direct oil into the said return flow channel, the upper end of the end plate boss being only slightly spaced from the contiguous end of the cover boss to permit oil to pass from said return flow channel back into the reservoir.

MARQUIS O. THRUSH.